(12) United States Patent
Bhide et al.

(10) Patent No.: US 9,323,815 B2
(45) Date of Patent: *Apr. 26, 2016

(54) STAR AND SNOWFLAKE SCHEMAS IN EXTRACT, TRANSFORM, LOAD PROCESSES

(75) Inventors: Manish A. Bhide, New Delhi (IN); Srinivas Kiran Mittapalli, Secunderabad (IN); Sriram Padmanabhan, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 528 days.

This patent is subject to a terminal disclaimer.

(21) Appl. No.: 13/618,282

(22) Filed: Sep. 14, 2012

(65) Prior Publication Data

US 2013/0117217 A1 May 9, 2013

Related U.S. Application Data

(63) Continuation of application No. 13/292,234, filed on Nov. 9, 2011.

(51) Int. Cl.
*G06F 17/30* (2006.01)

(52) U.S. Cl.
CPC .... *G06F 17/30563* (2013.01); *G06F 17/30589* (2013.01); *G06F 17/30592* (2013.01)

(58) Field of Classification Search
CPC .................. G06F 17/30592; G06F 17/30563; G06F 17/30292
USPC ................................................ 707/600, 602
See application file for complete search history.

(56) References Cited

U.S. PATENT DOCUMENTS

| 6,615,206 | B1 * | 9/2003 | Jakobsson et al. | 707/999.3 |
|---|---|---|---|---|
| 7,599,957 | B2 | 10/2009 | Liu et al. | |
| 8,849,835 | B1 * | 9/2014 | Carmi et al. | 707/748 |
| 2007/0027904 | A1 | 2/2007 | Chow et al. | |
| 2008/0235222 | A1 * | 9/2008 | Mojsilovic | 707/6 |
| 2011/0125705 | A1 * | 5/2011 | Aski et al. | 707/602 |
| 2012/0011096 | A1 * | 1/2012 | Aggarwal | 707/602 |

* cited by examiner

*Primary Examiner* — Hares Jami
(74) *Attorney, Agent, or Firm* — Susan Murray; Edell, Shapiro & Finnan, LLC (57) ABSTRACT

A computer-implemented method, computer program product and a system for supporting star and snowflake data schemas for use with an Extract, Transform, Load (ETL) process, comprising selecting a data source comprising dimensional data, where the dimensional data comprises at least one source table comprising at least one source column, importing a data model for the dimensional data into a data integration system, analyzing the imported data model to select a star or snowflake target data schema comprising target dimensions and target facts, generating a meta-model representation by mapping at least one source table or source column to each target fact and target dimension, automatically converting the meta-model representation into one or more ETL jobs, and executing the ETL jobs to extract the dimensional data from the data source and loading the dimensional data into the selected target data schema in a target data system.

7 Claims, 11 Drawing Sheets

STAR AND SNOWFLAKE SCHEMAS IN EXTRACT, TRANSFORM, LOAD PROCESSES

CROSS-REFERENCE TO RELATED APPLICATIONS

This application is a continuation of U.S. patent application Ser. No. 13/292,234, entitled "Star and Snowflake Schemas in Extract, Transform, Load Processes" and filed Nov. 9, 2011, the disclosure of which is incorporated herein by reference in its entirety.

BACKGROUND

1. Technical Field

The present invention relates generally to information warehouse systems, and more particularly to supporting star and snowflake data schemas in order to improve Extract, Transform, Load processing.

2. Discussion of Related Art

Enterprises are building increasingly large information warehouses to enable advanced information analytics and to improve the business value of information. The data in the warehouses are loaded via Extract, Transform, Load (ETL) processes, which extract data from a source, transform the data into a suitable form according to particular business needs, and then load the data into the warehouse(s). Establishing a structure for performing an ETL process is time-consuming, and complex, and there is no automated way to identify and handle loading of data into star and snowflake schemas while building ETL jobs. Conventional ETL systems require a user to manually write several dozen jobs for loading data into a typical snowflake schema.

BRIEF SUMMARY

Accordingly, embodiments of the present invention include a computer-implemented method, computer program product and a system for supporting star and snowflake data schemas for use with an Extract, Transform, Load (ETL) process, comprising selecting a data source comprising dimensional data, where the dimensional data comprises at least one source table comprising at least one source column, importing a data model for the dimensional data into a data integration system, analyzing the imported data model to select a target data schema for the dimensional data, where the target data schema is a star data schema or a snowflake data schema, and where the target data schema comprises target dimensions and target facts, generating a meta-model representation by, for each target fact, mapping at least one source table or source column to the target fact, and for each target dimension, mapping at least one source table or source column to the target dimension, automatically converting the meta-model representation into one or more ETL jobs, and executing the one or more ETL jobs to extract the dimensional data from the data source and loading the dimensional data into the selected target data schema in a target data system.

The above and still further features and advantages of embodiments of the present invention will become apparent upon consideration of the following detailed description thereof, particularly when taken in conjunction with the accompanying drawings wherein like reference numerals in the various figures are utilized to designate like components.

DETAILED DESCRIPTION

Figure 1:
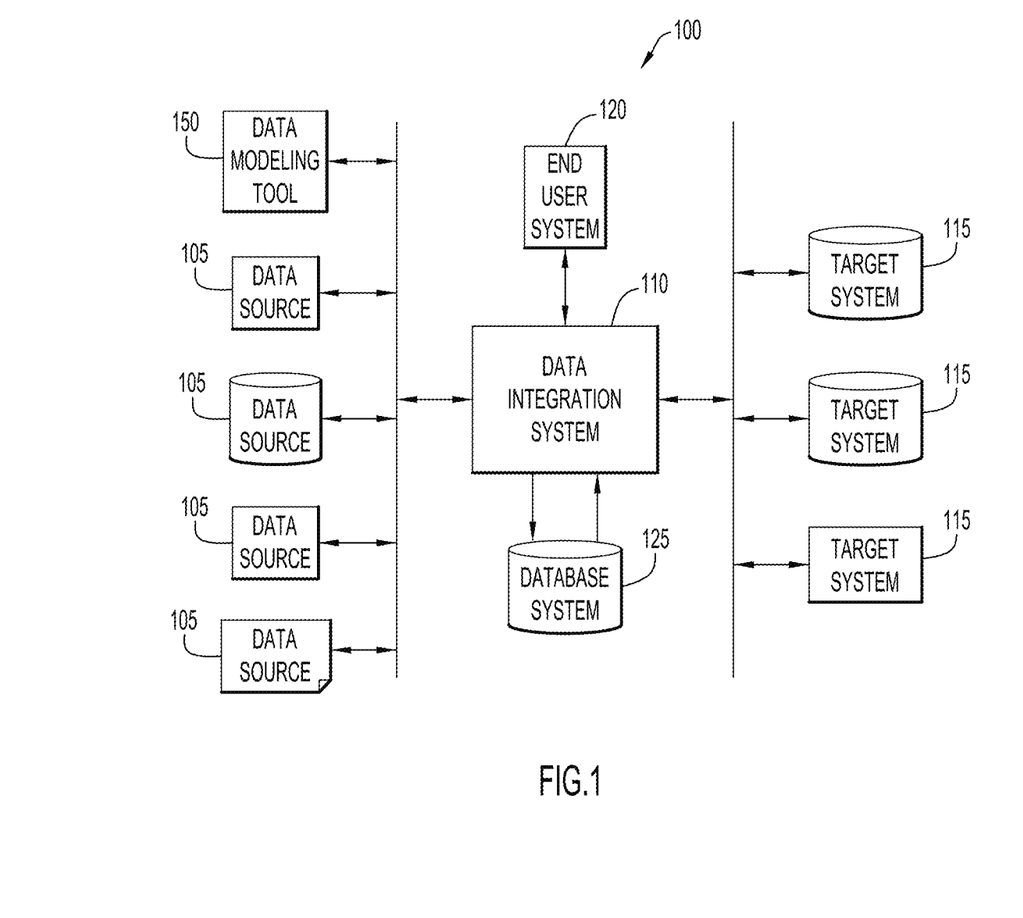
FIG. 1 is a block diagram illustrating a computing platform employed by an information warehouse system according to an embodiment of the present invention.

Referring now to the Figures, an exemplary computing platform or system 100 according to an embodiment of the present invention is illustrated in FIG. 1. The exemplary computing platform 100 comprises one or more data sources 105, a data integration system 110, one or more target systems 115, one or more end-user systems 120, and a database system 125. The platform or system 100 facilitates integration of data from various data sources 105 in different formats into the target systems 115.

The data sources 105 may include a wide variety of databases or storage structures residing at the same or different locations on one or more networks or systems. The target systems 115 may be in the form of computer systems, and may include databases (e.g., a data warehouse) or processing platforms used to further manipulate the data from the data integration system 110. The data sources 105 and target systems 115 may be implemented by any quantity of any type of conventional or other databases (e.g., network, hierarchical, relational, object, etc.) or storage structures (e.g., files, data structures, web-based storage, disk or other storage, etc.) and may comprise enterprise data sources (e.g., an IBM® DB2® database; IBM and DB2 are trademarks of International Business Machines Corporation, registered in many jurisdictions worldwide), personal and intra-organization data sources (e.g., spreadsheets, databases, etc.), or web-based data sources such as public databases (e.g., tax records, real estate records, court documents, etc.) and the like. The databases may store any desired information arranged in any fashion (e.g., tables, hierarchical, relations, objects, etc.), and may store additional information such as metadata in addition to data.

The data integration system 110 may be in the form of a computer system, and may perform a number of functions, such as an ETL process to extract data from data sources 105, transform the extracted data, and provide the extracted and transformed data to target systems 115. The data integration system 110 may send commands to one or more of the data sources 105 such that the data source 105 provides data to the data integration system 110.

The depicted platform or system 100 further comprises one or more end-user systems 120, which allow a user to interface with the platform or system 100. Although a single end-user system 120 is shown as interacting with the data integration system 110, it is understood that additional end-user systems 120 may interact with the data integration system 110, one or more of the data sources 105, and/or one or more of the target systems 115. The end-user systems 120 may present a graphical user or other interface (e.g., command line prompts, menu screens, etc.) to solicit information from users that pertain to the desired tasks to be performed (e.g., transformation of data) and to associate information (e.g., resource requirements, parameters, etc.). The end-user systems 120 communicate information to the data integration system 110 so that the data integration system may utilize the information to cleanse, combine, transform or otherwise manipulate the data it receives from the data sources 105 and provide the manipulated data to target systems 115.

The data integration system 110, target system 115 and end-user system 120 may each be implemented in the form of a processing system, or may be in the form of software, or a combination of both. They can each be implemented by any quantity of conventional or other computer systems or devices (e.g., computer terminals, personal computers of all types (e.g., including tablets, laptops, netbooks, etc.), or cellular telephones/personal data assistants of all types, and may include any commercially available operating systems for all types of computer hardware and any commercially available or custom software (e.g., browser software, communications software, word processing software, etc.). As described further with respect to FIG. 3, these systems may include processors, memories (e.g., RAM, cache, flash, ROM, solid-state, hard-disk, etc.), internal or external communications devices (e.g., modem, network adapter, etc.), I/O interfaces, output devices (e.g., displays, printers, etc.), and input devices (e.g., physical keyboard, touch screen, mouse, trackpad, microphone for voice recognition, etc.). If embodied in software (e.g., as a virtual image), they may be available on a recordable medium (e.g., magnetic, optical, floppy, DVD, CD, other non-transitory medium, etc.) or in the form of a carrier wave or signal for downloading from a source via a communication medium (e.g., bulletin board, network, LAN, WAN, Intranet, Internet, mobile wireless, etc.).

The platform or system 100 may also include a database or database management system 125. The database system 125 may be used to store metadata or other information for the data integration system 110. For example, the data integration system 110 may collect data from one or more data sources 105 and transform the data into forms that are compatible with one or more target systems 115 in accordance with the information in database system 125. Once the data is transformed, the data integration system 110 may store the data in the database system 125 for later retrieval. By way of example, the database system 125 may be in the form of a database server. The platform or system 100 may also include a data modeling tool, for example IBM® InfoSphere® Data Architect, from which data models can be imported into the platform or system 100. IBM and InfoSphere are trademarks of International Business Machines Corporation, registered in many jurisdictions worldwide.

It is understood that any of the various components of the platform or system 100 may be local to one another, or may be remote from and in communication with one or more other components via any suitable communication means or devices, for example a network such as a WAN, a LAN, Internet, Intranet, mobile wireless, etc. In one embodiment, the various components are communicatively connected to each other, for example, via network connections that represent any hardware and/or software configured to communicate information via any suitable communications media (e.g., WAN, LAN, Internet, Intranet, wired, wireless, etc.), and may include routers, hubs, switches, gateways, or any other suitable components in any suitable form or arrangement.

The platform or system 100 may include additional servers, clients, and other devices not shown, and individual components of the system may occur either singly or in multiples. For example, there may be more than four data sources 105, more than one data integration system 110, more than three target systems 115, etc.

Figure 2:
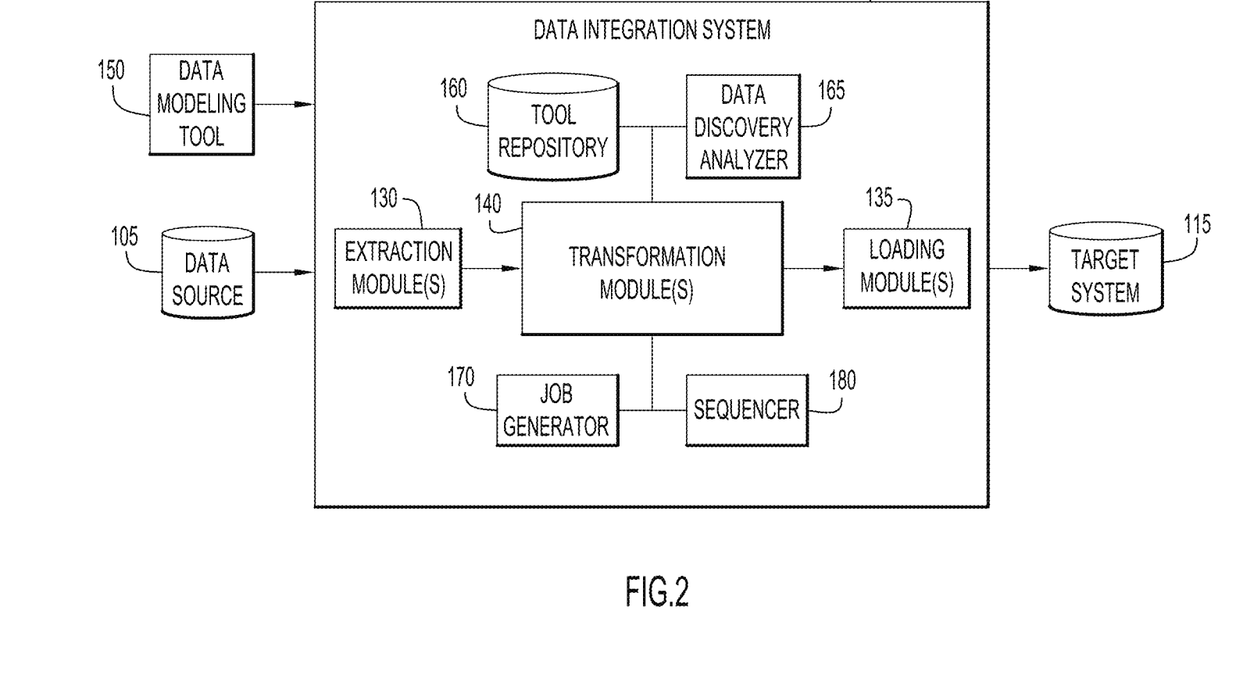
FIG. 2 is a block diagram illustrating a data integration system usable in a computing platform according to an embodiment of the present invention.

FIG. 2 depicts an example of a data integration system 110 usable in a computing platform 100 according to an embodiment of the present invention. The data integration system 110 comprises various components, including one or more extraction modules 130, one or more transformation modules 140, and one of more loading modules 135, as well as a tool repository 160, data discovery analyzer 165, ETL job generator 170, and job sequencer 180. Each of the components of data integration system 110 may be implemented by any combination of software and/or hardware modules or processing units. The operation of each component in the data integration system 110 is more fully described with reference to FIGS. 5-7, however the overall operation may be summarized as the extraction module(s) 130 importing data models from data modeling tool 150 and extracting data from one or more data sources 105, the transformation module(s) 140 analyzing and transforming the data, and the loading module(s) 135 generates output of the transformed data for one or more target systems 115. It is understood that the functionality of any one of these components (e.g., extraction module(s) 130 and transformation module(s) 140) may be combined into a single device or process or split among multiple devices or processes.

The data integration system 110 may be an ETL engine such as an IBM® InfoSphere® DataStage®, Informatica PowerCenter, or Oracle Warehouse Builder engine. The data discovery analyzer 165 may be, for example, an IBM® Information Analyzer or IBM® InfoSphere® Discovery tool, and the job generator 170 may be, for example, an IBM® InfoSphere® FastTrack tool. IBM, DataStage, and InfoSphere are trademarks of International Business Machines Corporation, registered in many jurisdictions worldwide. Other product and service names might be trademarks of other companies.

Figure 3:
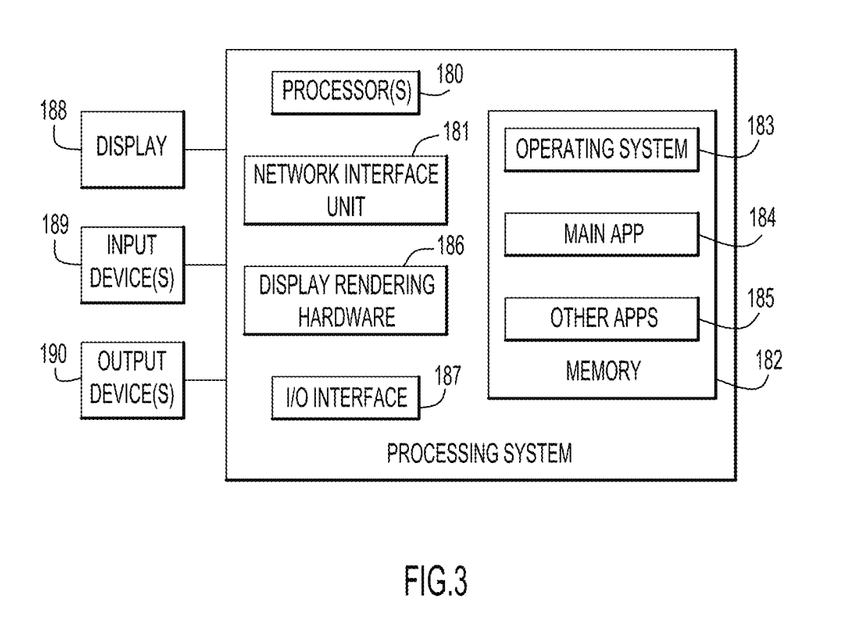
FIG. 3 is a block diagram illustrating a processing system that may be used in the computer systems of the present invention.

FIG. 3 depicts an example hardware implementation of a processing system such as a data integration system 110, target system 115 or end-user system 120 that may be used in system 100. The depicted processing system comprises one or more processors 180, a network interface unit 181, memory 182, display rendering hardware 186, and input/output interface 187. Resident in memory 182 are operating system 183, a main application 184 such as a database application, and optionally other applications 185. When the depicted processing system is an end-user system 120, the main application 184 may, for example, provide an interface such as a graphical user interface (GUI) for a user of the end-user system 120 to interact with the data integration system 110. Processor 180 is, for example, a data processing device such as a microprocessor, microcontroller, system on a chip (SOC), or other fixed or programmable logic, that executes instructions for process logic stored in memory 182. Network interface unit 181 enables communication to the platform or system 100. Memory 182 may be implemented by any quantity of any type of conventional or other memory or storage device, and may be volatile (e.g., RAM, cache, flash, etc.), or non-volatile (e.g., ROM, hard-disk, optical storage, etc.), and include any suitable storage capacity. Display rendering hardware 186 may be a part of processor 180, or may be, e.g., a separate Graphics Processor Unit (GPU).

I/O interface 187 enables communication between display device 188, input device(s) 189, and output device(s) 190, and the other components of the processing system, and may enable communication with these devices in any suitable fashion, e.g., via a wired or wireless connection. The display device 188 may be any suitable display, screen or monitor capable of displaying information to a user of the processing system, for example the screen of a tablet or the monitor attached to a computer workstation. Input device(s) 189 may include any suitable input device, for example, a keyboard, mouse, trackpad, touch input tablet, touch screen, camera, microphone, remote control, speech synthesizer, or the like. Output device(s) 190 may include any suitable output device, for example, a speaker, headphone, sound output port, or the like. The display device 188, input device(s) 189 and output device(s) 190 may be separate devices, e.g., a monitor used in conjunction with a microphone and speakers, or may be combined, e.g., a touchscreen that is a display and an input device, or a headset that is both an input (e.g., via the microphone) and output (e.g., via the speakers) device.

Figure 4A:
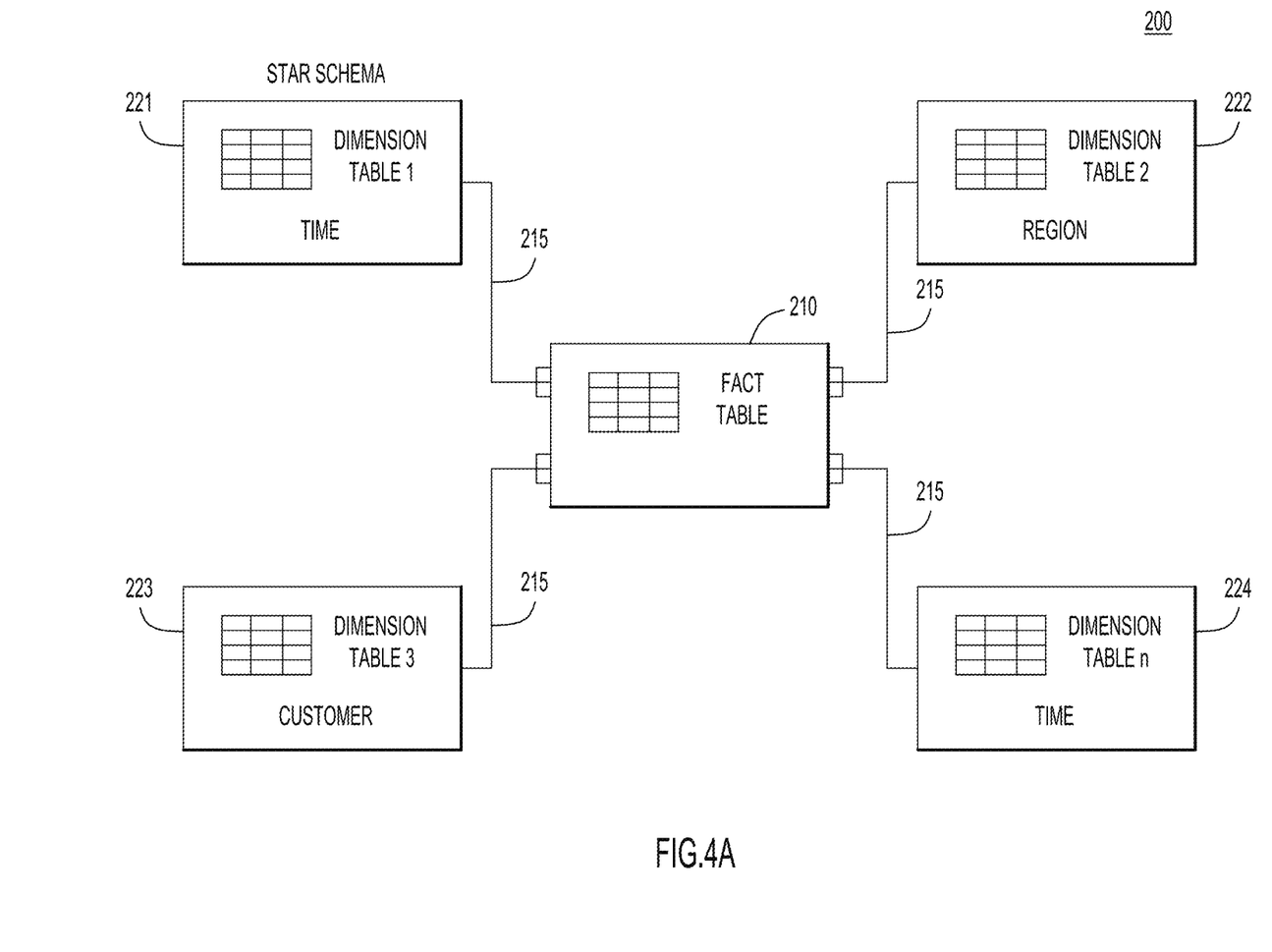
FIGS. 4A and 4B are diagrammatic illustrations of data schemas according to various embodiments of the present invention.
Figure 4B:
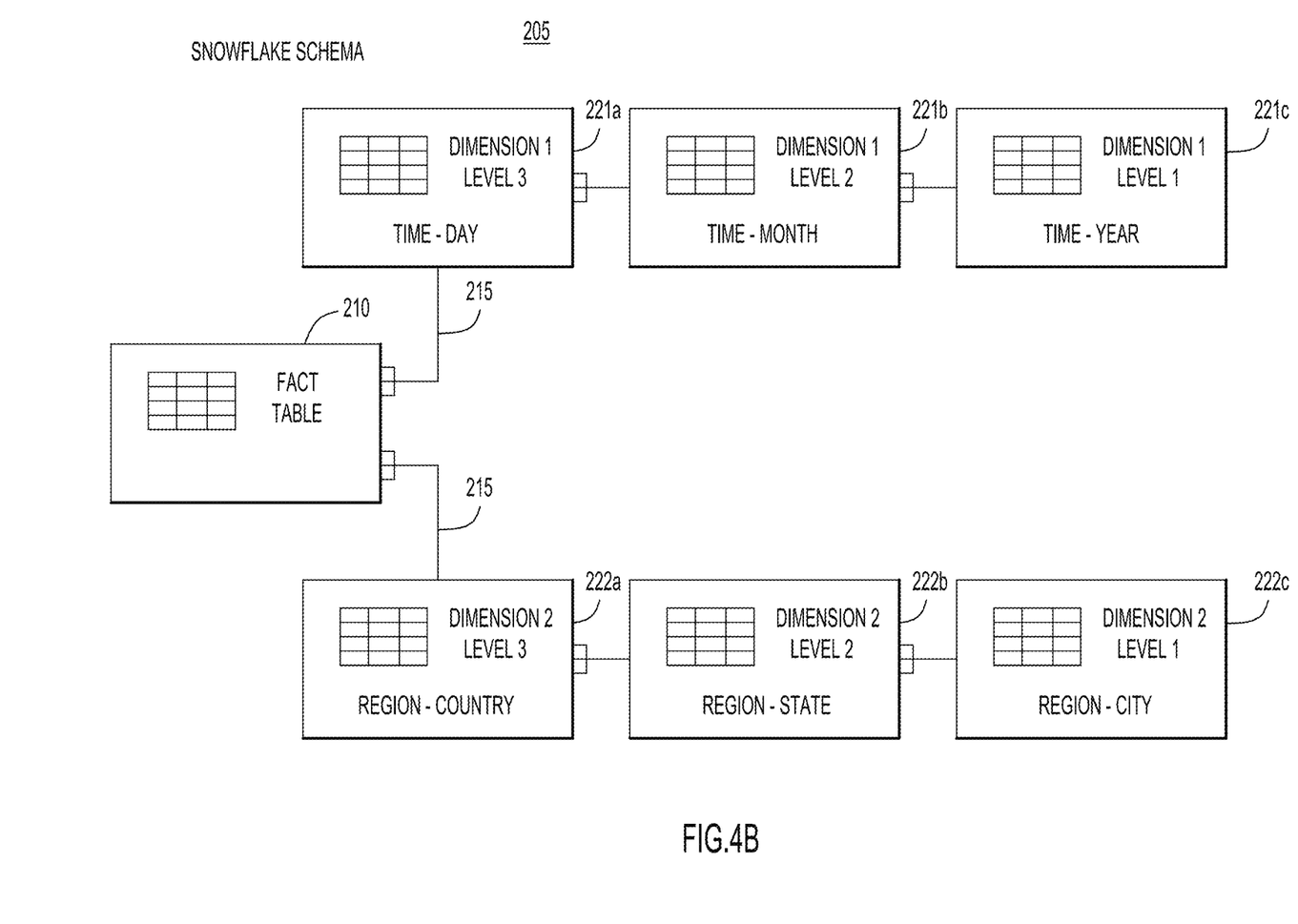

FIGS. 4A and 4B depict are diagrammatic illustrations of a star schema 200 and a snowflake schema 205 according to various embodiments of the present invention. Each schema 200, 205 comprises a single fact table 210, and one or more dimension tables 221, 222, 223, 224. A dimension is a term in data management and data warehousing that refers to logical groupings of data such as geographic location, customer information, or product information. A dimension table is a table that stores attributes that describe aspects of a dimension. For example, a time table stores the various aspects of time such as year, quarter, month, and day. A fact table is a table that stores facts that measure the business, such as sales, cost of goods, or profit. Fact tables also contain foreign keys to the dimension tables. These foreign keys relate each row of data in the fact table to its corresponding dimensions and levels. The data model also contains the physical model that comprises the names of the actual tables defined in the system.

Dimensions may reference zero or more hierarchies. Hierarchies describe the relationship and structure of the referenced attributes that are grouped into levels, and provide a navigational and computational way to traverse the dimension. Related attributes and the joins that are required to group these attributes are defined in the properties of the dimension. Dimensions also have a type that describes if the dimension is time-oriented or non-time-oriented (regular). For example, a dimension called Time that contains levels like Year, Quarter, and Month is a Time type. Another dimension called Market that contains levels like Region, State, and City is a Regular type. Type information can be used by applications to intelligently and appropriately perform time-related functions.

Star and snowflake schema designs are mechanisms to separate facts and dimensions into separate tables. As shown in FIG. 4A, a star schema 200 is a type of database schema that is composed of a single, central fact table 210 surrounded by dimension tables 221, 222, 223, 224. A star schema can have any number of dimension tables. The multiple branches at the end of the links 215 connecting the tables indicate a many-to-one relationship between the fact table and each dimension table. As shown in FIG. 4B, a snowflake schema 205, sometimes called a snowflake join schema, consists of one fact table 215 connected to many dimension tables 221, 222, each of which can reference a hierarchy (e.g., be connected to other dimension tables). The depicted snowflake schema 220 has two dimensions 221, 222, each dimension having three levels, e.g., dimension 221 has three levels 221*a*, 221*b*, 221*c*, and dimension 222 has three levels 222*a*, 222*b*, 222*c*. A snowflake schema can have any number of dimensions and each dimension can have any number of levels. In either schema design, each table is related to another table with a primary key or foreign key relationship. Primary and foreign key relationships are used in relational databases to define many-to-one relationships between tables. The primary key/foreign key relationships between tables in a star or snowflake schema, sometimes called many-to-one relationships, represent the paths along which related tables are joined together in the database. These join paths are the basis for forming queries against historical data.

Figure 5:
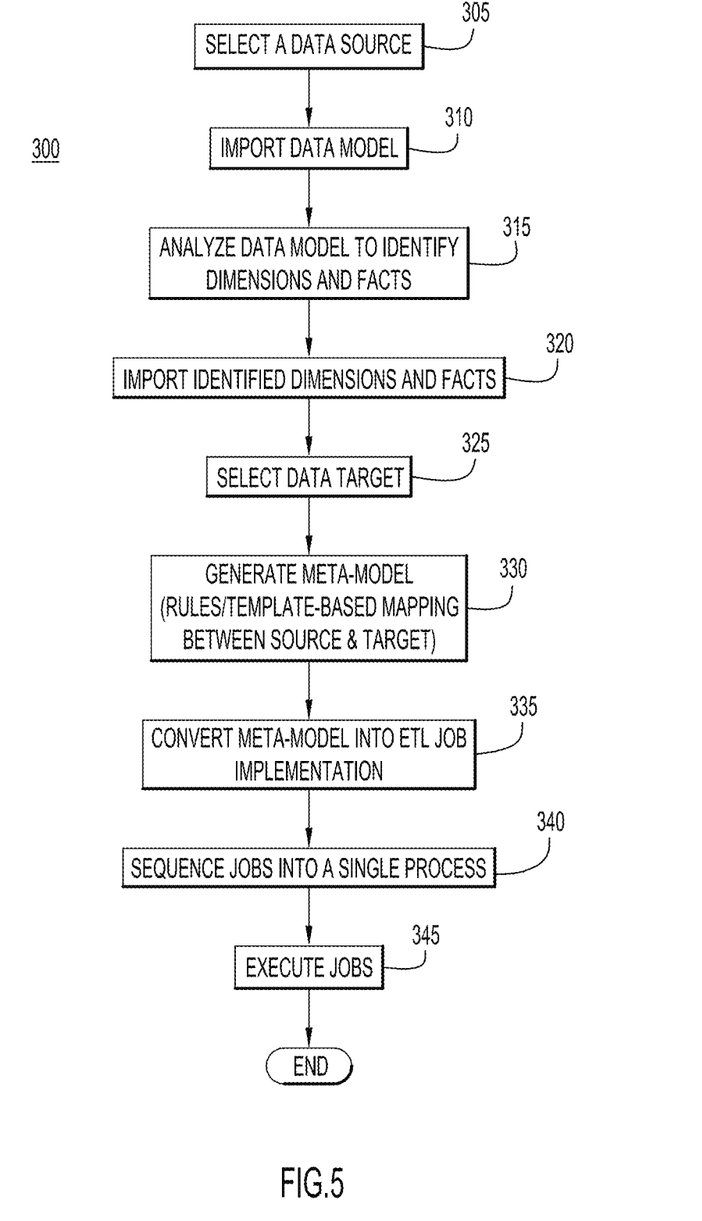
FIG. 5 is a flowchart depicting a process for supporting star and snowflake data schemas in an ETL process, according to an embodiment of the present invention.
Figure 6A:
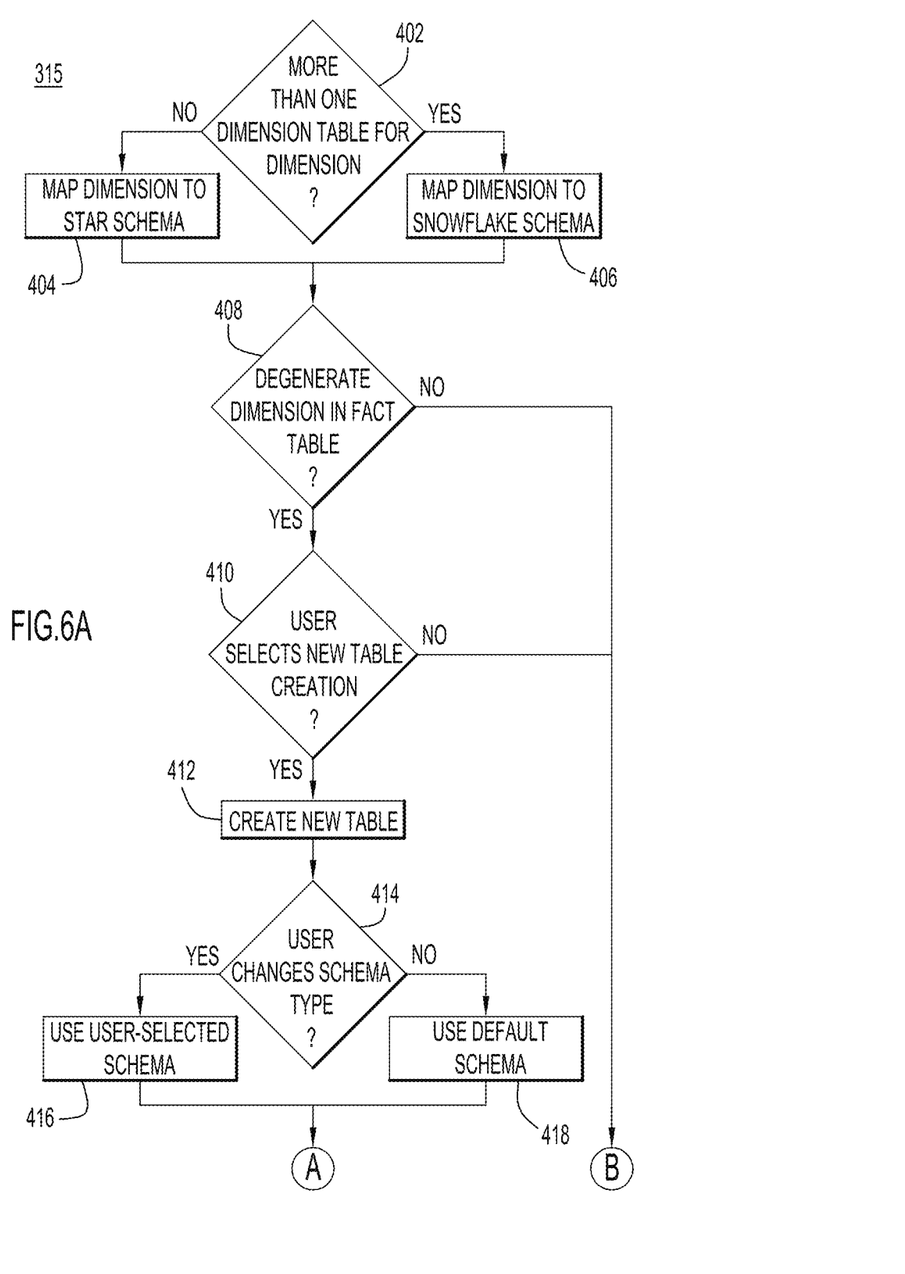
FIG. 6 is a flowchart depicting a process for identifying dimension types, according to an embodiment of the present invention.
Figure 6B:
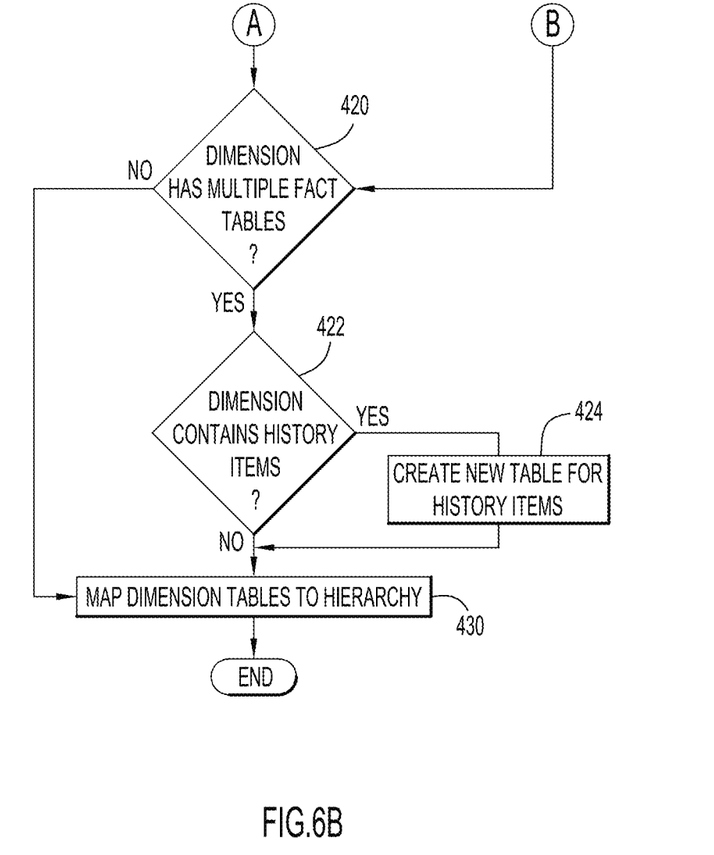
Figure 7:
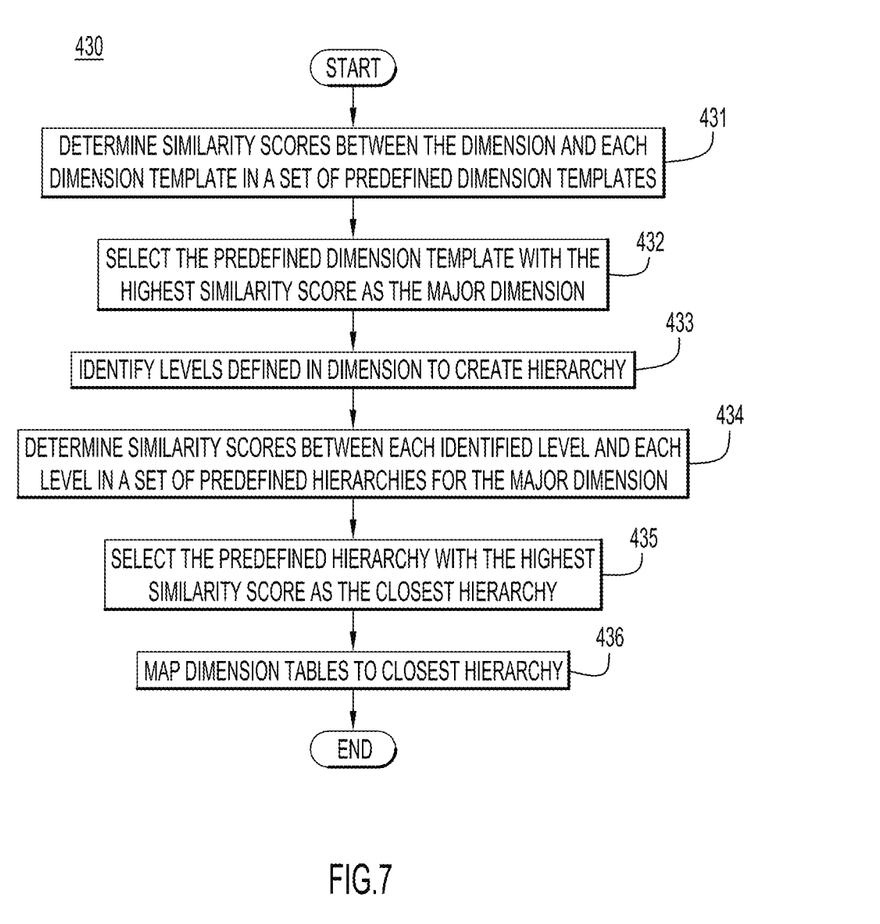
FIG. 7 is a flowchart depicting a process for identifying dimension hierarchies, according to an embodiment of the present invention.

FIGS. 5 through 7 depict various processes for supporting star and snowflake data schemas in an ETL process, according to various embodiments of the present invention. Although each of these Figures and the accompanying descriptions refer to a single source, dimension, or table, it is understood that the present embodiments are not so limited, and that the processes may be performed on multiple sources, dimensions, and tables at the same or different times. For example, the various processes may run concurrently or sequentially, may be scheduled to run at periodic intervals or may be run on demand, or may run at any time and in any combination desired for a particular implementation.

The present embodiments support star and snowflake schemas as first-class data types similar to tables. As first-class data types, the schemas are treated as specialized entities or components that can be manipulated via a user interface, and that can own other objects such as primary keys, foreign keys, table columns and the like. The schemas have attributes such as the schema type (e.g., star or snowflake), time dimension hierarchy, region hierarchy, etc. The embodiments also provide rules/template-based mapping between the data source 105 and data target 115 specifically from a dimensional loading perspective, and automatically generate jobs for loading data into star and snowflake schemas based on the mapping.

Referring now to FIG. 5, reference numeral 300 generally designates a flow chart depicting an example process for supporting star and snowflake data schemas in an ETL process, according to an embodiment of the present invention. For ease of reference, the process 300 is described as being performed by the "system," but this reference is not limiting, and it is understood that this process 300 may be carried out by any suitable server, client or other device, and may be carried out by, e.g., the data integration system of FIGS. 1 and 2, one or more of the modules of FIG. 2 such as data discovery analyzer 165, or any other device, etc.

In step 305, the system selects a data source 105 from which to extract data, and in step 310 imports the data model from the data source 105 or a data modeling tool such as IBM® InfoSphere® Data Architect into the tool repository 160. In step 315, the system (and more particularly the data discovery analyzer 165) analyzes the data model to identify dimensions and facts in the data model. The data model contains information about the data tables, including whether the tables are fact tables or dimension tables. For example, a fact table may be represented by (in the imported model):

```
<LUW:LUWTable xmi:id="_AD_4MM-lEd-E3flNE1LCNw"
  name="Table1" schema="_9BZC0M-kEd-E3flNE1LCNw">
  <extensions xsi:type="dimensional:Fact"
    xmi:id="_zOrWIM-lEd-E3flNE1LCNw" userDefined="true" />
```

In step 320 the system imports the identified dimensions and facts into the tool repository 160, and in step 325 the system selects a data target system 115. In step 330 the system generates a meta-model comprising rules and template-based mapping between the data source 105 and the target system 115, and in step 335 the meta-model is converted into an ETL job implementation comprising one or more jobs to extract, transform and load the data from the data source 105 into the target system 115. In step 340, the sequencer 180 sequences the jobs into a single process, and in step 345 the system executes the jobs.

FIG. 6 is a flowchart depicting a process 315 for identifying dimension types, according to an embodiment of the present invention. For ease of reference, the process 315 is described as being performed by the "system," but this reference is not limiting, and it is understood that this process 315 may be carried out by any suitable server, client or other device, and may be carried out by, e.g., the data integration system of FIGS. 1 and 2, one or more of the modules of FIG. 2 such as data discovery analyzer 165, or any other device, etc. Generally, process 315 is cycled for each dimension identified in the data model.

In step 402, the system maps the dimension to either a star or snowflake schema, depending on the number of tables present in each dimension and the relationship between the dimensions. In particular, if there is only one table in the dimension, then the system in step 404 maps the dimension to a star schema, and if there is more than one table, then the system in step 406 maps the dimension to a snowflake schema. After either step 404 or 406, the system proceeds to step 408, where it determines if a degenerate dimension is present in the fact table of the dimension, and if yes proceeds to step 410, and if not proceeds to step 418. A degenerate dimension is dimension that does not have its own dimension table, e.g., data that is dimensional in nature but is stored in a fact table, a dimension key in a fact table that does not have its own dimension table, or a large text column in a dimension table. Common examples of degenerate dimensions include transaction numbers, invoice numbers, and the like.

In step 410, the system presents the user with an option to create a new table for the degenerate dimension, and if a user selection of this option is received, the system proceeds to step 412, but if not, or if the user declines the option, the system proceeds to step 420. In step 412, the system creates a new table and moves the degenerate dimension to the new table, and links the original dimension with the new dimension using a primary key-foreign key relationship, and then proceeds to step 414. In step 414, the system presents the user with an option to change the schema type (e.g., star schema, snowflake schema, etc.), and if a user schema change is received then in step 416 the system uses the user-selected schema, but if not in step 418 the system uses the default schema. After step 416 or step 418, the system proceeds to step 420.

In step 420, the system determines if the dimension has multiple fact tables, and if yes proceeds to step 422, and if not proceeds to step 430. In step 422, the system determines if the dimension contains history items, and if yes proceeds to step 424, and if not proceeds to step 430. In step 424, the system creates a new table for the history attributes, leaving the primary keys, business keys, and any non-history items or reference keys in the original table. The history table contains its own surrogate keys and includes a reference to the non-history table. The system then proceeds to step 430. In step 430, the system maps dimension tables to a hierarchy, if necessary, e.g., if the dimension is a slowly changing dimension or other dimension comprising multiple dimension tables. Step 430 is described further with respect to FIG. 7. After completion of step 430, process 315 then ends (e.g., the system then processes the next dimension, returns to step 320 of process 300 of FIG. 5, etc.).

FIG. 7 is a flowchart depicting a process 430 for identifying dimension hierarchies, according to an embodiment of the present invention. For ease of reference, the process 430 is described as being performed by the "system," but this reference is not limiting, and it is understood that this process 430 may be carried out by any suitable server, client or other device, and may be carried out by, e.g., the data integration system of FIGS. 1 and 2, one or more of the modules of FIG. 2 such as data discovery analyzer 165, or any other device, etc.

In step 431, the system determines similarity scores between the dimension and each dimension template in a set of predefined dimension templates. The predefined dimension templates include standard templates for each predefined dimension such as product, time, region, account etc., which have standard columns. For example, the time dimension template has columns such as month_id, quarter_id, qtr_id, etc.

Each dimension and its columns are compared against the predefined dimension templates using a similarity identification algorithm. The algorithm compares the imported dimension to each of the predefined dimension templates, and for each column of the imported dimension determines the column of the predefined dimension template that has the highest similarity score. The similarity score for the imported dimension to a given dimension template is the sum of the similarity scores for each of its columns. The similarity scores may be determined via any suitable method for measuring similarity between two sequences which may vary in time or speed, for example Dynamic Time Warping (DTW), derivative Dynamic Time Warping, hidden Markov models, measurement of a Levenshtein distance, etc. In one embodiment, DTW is used. In step 432, the system selects the predefined dimension template with the highest similarity score as the major dimension.

Proceeding to step 433, the system creates a hierarchy for the dimension by identifying each level defined in the dimension. In step 434, the system determines similarity scores between each identified level and each level in a set of predefined hierarchies for the major dimension. For example, the time dimension may have a predefined hierarchy that extracts out Quarter, Month, Date, etc. The similarity scores are determined via any suitable method for measuring similarity between two sequences which may vary in time or speed, for example Dynamic Time Warping (DTW), derivative Dynamic Time Warping, hidden Markov models, measurement of a Levenshtein distance, etc. In one embodiment, DTW is used. In step 435, the system selects the predefined hierarchy with the highest similarity score as the closest hierarchy, and in step 436 maps the tables forming the dimension to the closest hierarchy. Process 430 then ends (e.g., the system then processes the next dimension, returns to step 320 of process 300 of FIG. 5, etc.).

Figure 8:
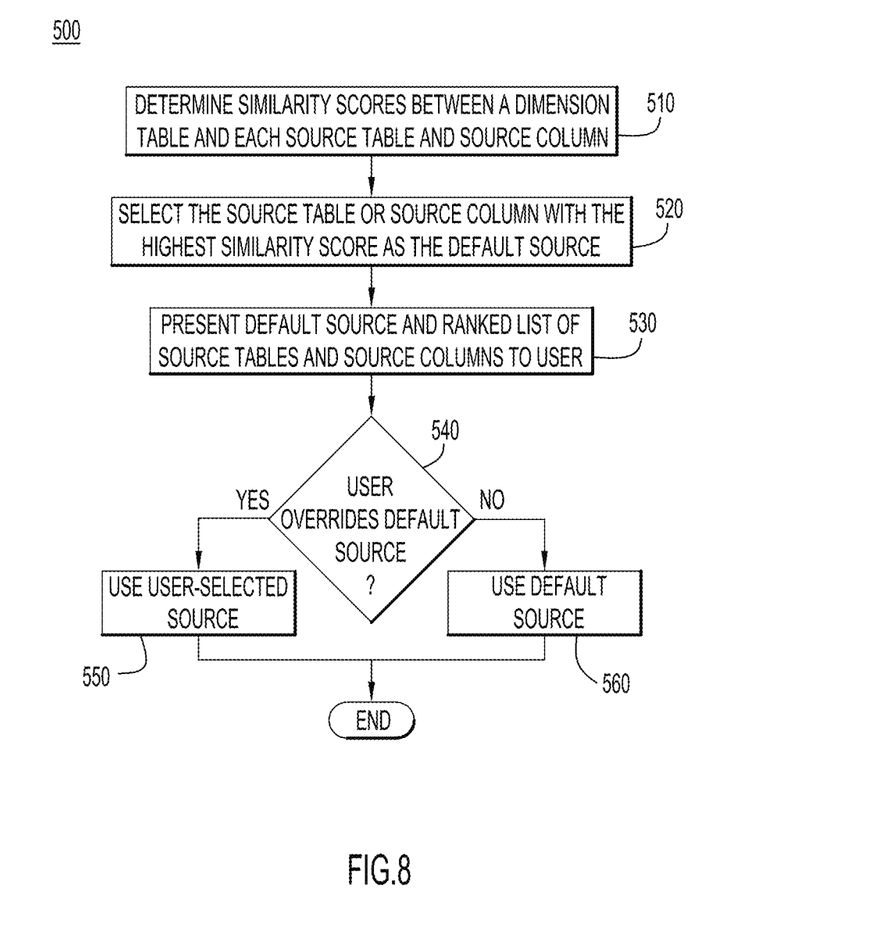
FIG. 8 is a flowchart depicting a process for identifying source to target mappings, according to an embodiment of the present invention.

FIG. 8 is a flowchart depicting a process 500 for identifying source to target mappings, according to an embodiment of the present invention. For ease of reference, the process 500 is described as being performed by the "system," but this reference is not limiting, and it is understood that this process 500 may be carried out by any suitable server, client or other device, and may be carried out by, e.g., the data integration system of FIGS. 1 and 2, one or more of the modules of FIG. 2 such as data discovery analyzer 165, or any other device, etc.

In step 510, the system determines the similarity scores between a dimension table and each of the source tables and source columns, using any suitable method for measuring similarity between two sequences which may vary in time or speed, for example Dynamic Time Warping (DTW), derivative Dynamic Time Warping, hidden Markov models, measurement of a Levenshtein distance, etc. The source tables and columns may be in multiple formats such as normalized, de-normalized, or partially normalized. The system may have a number of predefined templates for mapping source data to different types of target dimensions and facts, for example, a timestamp column to a time dimension, multiple columns of a single table to dimensions of a snowflake schema, multiple tables to dimensions of a snowflake schema, generating dimensions from the rows of a single table, loading data into a fact from a source table while aggregating at a dimension level, etc.

In step 520, the system selects the source table or source column with the highest similarity score as the default source for the dimension table, and in step 530 presents the default source and a ranked list of source tables and source columns to the user. The ranked list may be presented as, for example, a list of source tables and source columns in descending order of similarity score. The user may override the default source by, e.g., selecting a particular source table or column from the list. In step 540, the system checks to determine if the user has overridden the default source, and if yes, in step 550 uses the user-selected source table or column as the source, but if no, then in step 560 the system uses the default source. The process 500 then ends (e.g., the system then processes the next dimension, returns to process 300 of FIG. 5, etc.).

Figure 9:
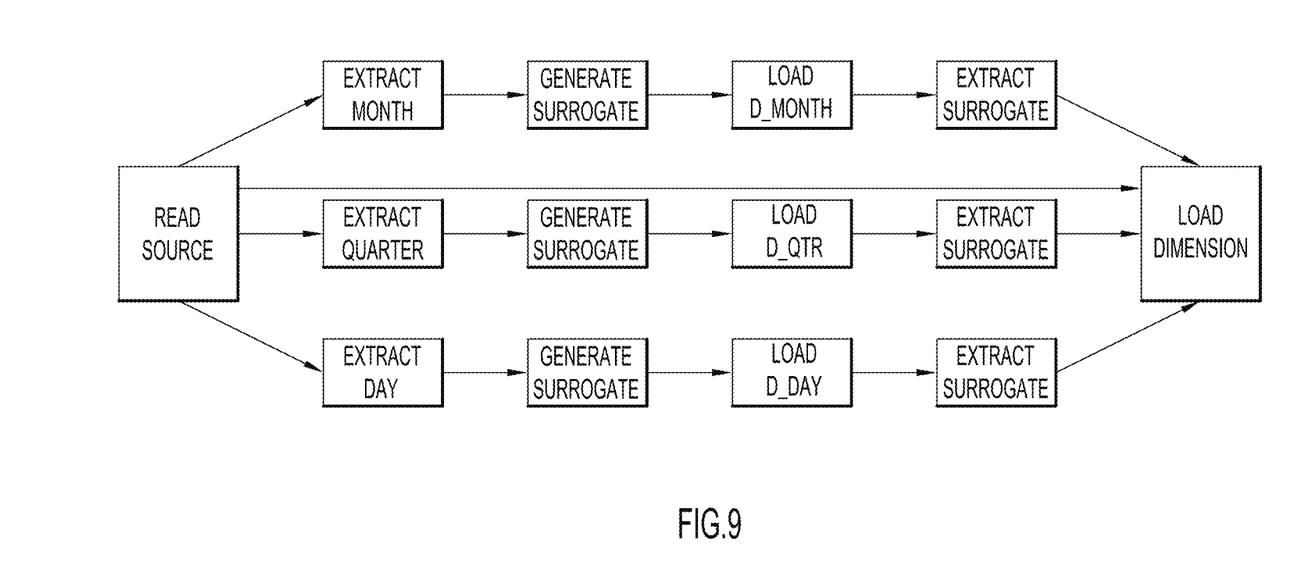
FIG. 9 is a schematic representation of a meta-model, according to an embodiment of the present invention.

As noted above with respect to process 300, the system in step 330 generates a meta-model comprising rules and template-based mapping between the data source 105 and the target system 115. This meta-model comprises all of the source to target mappings generated by process 500, and includes various operators such as filter, union, group by, project, join, extract, generate surrogate key, etc. An example meta-model is depicted in FIG. 9. The system converts the meta-model representation into the actual job implementation, the job generator 170 generates the various jobs, and the sequencer 180 sequences the jobs so that they may be executed.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a solid state disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, a phase change memory storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, e.g., an object oriented programming language such as Java, Smalltalk, C++ or the like, or a procedural programming language, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

It is to be understood that the software for the computer systems of the present invention embodiments may be implemented in any desired computer language and could be developed by one of ordinary skill in the computer arts based on the functional descriptions contained in the specification and flow charts illustrated in the drawings. By way of example only, the software may be implemented in the C#, C++, Python, Java, or PHP programming languages. Further, any references herein of software performing various functions generally refer to computer systems or processors performing those functions under software control.

The computer systems of the present invention embodiments may alternatively be implemented by any type of hardware and/or other processing circuitry. The various functions of the computer systems may be distributed in any manner among any quantity of software modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

A processing system suitable for storing and/or executing program code may be implemented by any conventional or other computer or processing systems preferably equipped with a display or monitor, a base (e.g., including the processor, memories and/or internal or external communications devices (e.g., modem, network cards, etc.) and optional input devices (e.g., a keyboard, mouse or other input device)). The system can include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the system to become coupled to other processing systems or remote printers or storage devices through intervening private or public networks. Modems, cable modem and Ethernet cards are just a few of the currently available types of network adapters.

The flowchart and block diagrams in the Figures illustrate the architecture, functionality, and operation of possible implementations of systems, method and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometime be executed in the reverse order, depending on the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method of supporting star and snowflake data schemas for use with an Extract, Transform, Load (ETL) process, comprising:
    selecting a data source comprising dimensional data, wherein the dimensional data comprises a plurality of dimensions and a plurality of source tables each comprising at least one source column;
    importing a data model for the dimensional data into a data integration system, wherein the data model includes information pertaining to dimension tables and fact tables;
    analyzing the imported data model to determine a target data schema for individual dimensions of the dimensional data, wherein the target data schema is a star data schema or a snowflake data schema, and wherein the target data schema comprises target dimensions and target facts, and wherein analyzing the imported data model includes:
        analyzing the imported data model and determining a quantity of dimension tables for the individual dimensions of the dimensional data;
        determining the star data schema as the target data schema and mapping a dimension of the dimensional data to the star data schema in response to the analyzing indicating the dimension contains a single dimension table; and
        determining the snowflake data schema as the target data schema and mapping a dimension of the dimensional data to the snowflake data schema in response to the analyzing indicating the dimension contains a plurality of dimension tables;
        wherein at least one dimension of the dimensional data is mapped to the star data schema and at least one other dimension of the dimensional data is mapped to the snowflake data schema;
    generating a meta-model representation by, for each target fact, mapping at least one source table or source column to the target fact, and for each target dimension, mapping at least one source table or source column to the target dimension;

automatically converting the meta-model representation into one or more ETL jobs; and executing the one or more ETL jobs to extract the dimensional data from the data source and load the dimensional data into the determined target data schema for corresponding dimensions in a target data system.

2. The method of claim 1, further comprising:

identifying a major dimension for the dimensional data, and a hierarchy for the major dimension.

3. The method of claim 2, wherein the identifying the major dimension comprises:

comparing the dimensional data to each template in a set of predefined dimension templates using a similarity identification algorithm that generates a similarity score; and selecting the template that has the highest similarity score as the major dimension.

4. The method of claim 3, wherein the similarity score is determined using a Dynamic Time Warping (DTW) method.

5. The method of claim 1, further comprising:

mapping the target dimensions and target facts to predefined dimension templates using a similarity score.

6. The method of claim 1, wherein the generating the meta-model representation further comprises, for each target fact and each target dimension:

determining a similarity score measuring the similarity between the target fact or target dimension and each source table;

determining a similarity score measuring the similarity between the target fact or target dimension and each source column; and selecting the source table or source column with the highest similarity score as the source table or source column that is mapped to the target fact or target dimension.

7. The method of claim 1, wherein the generating the meta-model representation further comprises, for each target fact and each target dimension:

determining a similarity score measuring the similarity between the target fact or target dimension and each source table;

determining a similarity score measuring the similarity between the target fact or target dimension and each source column;

presenting all of the similarity scores to a user; and receiving a user indication of a selected source table or source column as the source table or source column that is mapped to the target fact or target dimension.

\* \* \* \* \*